Aug. 11, 1925.
M. E. THOMPSON
SYNCHRONOUS MOTOR
Filed Jan. 31, 1922
2 Sheets-Sheet 1
1,549,337
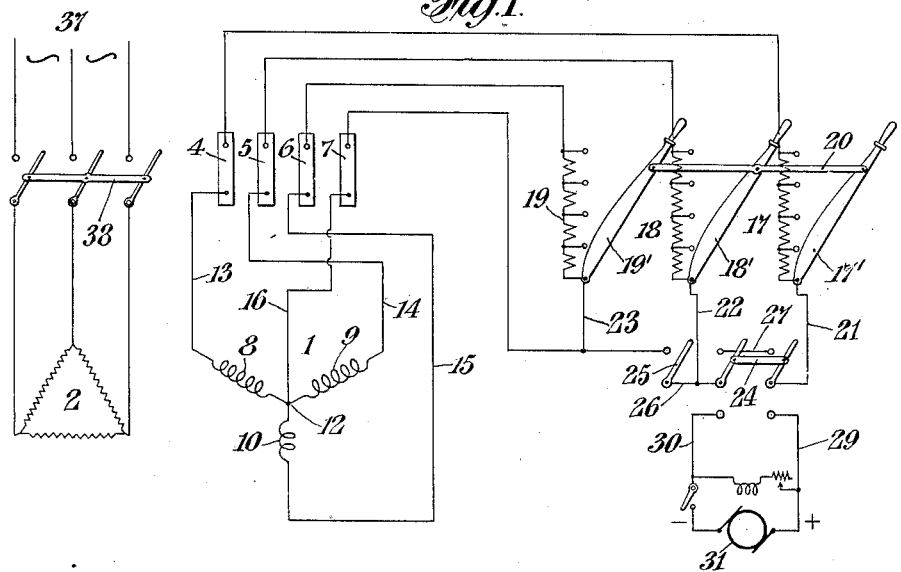
Fig. 1.
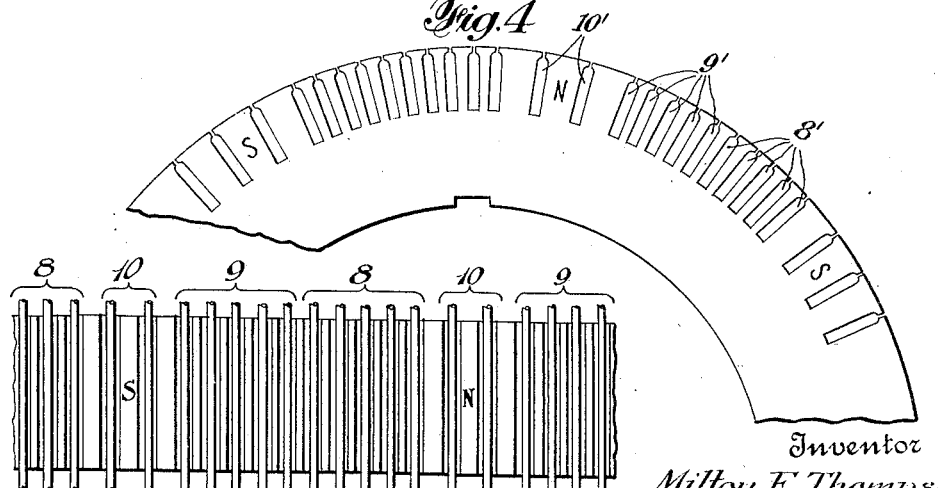
Fig. 4.
Fig. 2.
Inventor
Milton E. Thompson
By his Attorney Aug. 11, 1925.

M. E. THOMPSON

SYNCHRONOUS MOTOR

Filed Jan. 31, 1922

Inventor

Milton E. Thompson

By his Attorney

Patented Aug. 11, 1925.

1,549,337

UNITED STATES PATENT OFFICE.

MILTON E. THOMPSON, OF RIDGWAY, PENNSYLVANIA.

SYNCHRONOUS MOTOR.

Application filed January 31, 1922. Serial No. 533,015.

*To all whom it may concern:*

Be it known that I, MILTON E. THOMPSON, a citizen of the United States, and a resident of Ridgway, Elk County, State of Pennsylvania, whose post-office address is care of Ridgway Dynamo & Engine Co., same place, have invented certain new and useful Improvements in Synchronous Motors, of which the following is a specification.

This invention relates to alternating current dynamo electric machines and particularly to alternating current motors of the synchronous type.

The object of the invention generally stated is a synchronous, alternating current machine or motor which may be started under load conditions from the alternating current end as an induction motor with high torque and low current consumption and a minimum line factor disturbance and which will also operate with efficiency and stability as a synchronous motor after the synchronous speed is reached.

A further object of the invention is a system of control and connections and associated devices particularly adapted for use with the aforesaid machine.

Synchronous motors of the prior art usually embody an exciting field, either of the distributed or concentrated type, having salient poles with squirrel cage windings separate and distinct from and superposed upon the exciting winding which serve as short circuited secondaries for starting from the alternating current end, but the torque under such conditions of starting is insufficient for starting the motor under anything like full load and moreover the starting often taxes the current capacity of the supply line and causes considerable line factor disturbances.

The motor of this application embodies novel features of construction and arrangement which enable it to be started from the alternating current end as an induction motor of the wound secondary type and with the high torque characteristics thereof and which will permit it to operate at synchronous speed as a synchronous motor with a maximum efficiency and stability after synchronous speed is reached.

To these ends the motor of this application embodies the usual primary or alternating current member, usually the stator, which is supplied with power from an alternating current source, and an exciting or field member, preferably a rotor, of novel construction and arrangement, having generally a field or exciting winding, so distributed in groups about the exciting member that a portion of the winding may be connected to produce salient poles, and that all the winding may be connected together in groups as a polyaxial closed circuit induction winding. The first-mentioned part of the winding is to be connected to a direct current source of supply when the motor has been brought to synchronous speed, and it is preferably composed of two sections which form two of the three divisions of the entire winding when it is connected to form an induction motor winding for starting. The other part of the winding, in addition to its function as a branch of the polyaxial closed winding for starting from rest, functions as a torque maintaining and steadying winding during the synchronizing step and as an effective damping coil during synchronous operation. Preferably the three divisions of the entire winding are connected in star for starting purposes and with suitable resistances to obtain high starting torque. Where the field or exciting member is, as I prefer, the rotor, the different sections of the entire winding are connected to slip rings, carried by the rotor, through which and suitable switching devices the circuits are completed to operate the motor as an induction motor for starting and to operate it as a synchronous motor when the proper speed is reached.

The conductors of the field windings are disposed in slots distributed in groups about the field member. The section of the winding which is only used for starting purposes is preferably made of fewer turns than either of the two sections used for direct current excitation, because this section is carried about that part of the magnetic structure where the salient poles are formed when the motor is being operated as a synchronous motor and only a portion of this space can be spared for the winding. Nevertheless, I obtain a sufficient uniformity of the ampere turns of the three sections of the entire winding, when starting as an induction motor, by the use of a lesser resistance in series with the shorter winding when the motor is started, and because of the lesser resistance of the winding itself at that time, and as the motor is brought up to speed and the external resistances are eliminated.

I have found by this construction that I am able to effect the desired efficient starting under heavy load and that, notwithstanding that the pole turns of the field member are reduced in cross section by that portion of the winding used only for starting purposes, the motor operates with excellent efficiency as a synchronous motor.

The above features of construction and operation are incorporated into the machine without impairing its efficiency and stability as a synchronous motor, the reluctance of the magnetic circuit of the exciting or field member being relatively high as required for most efficient operation as a synchronous motor, and stability of operation being obtained at unity power factor and the performance of the machine as a synchronous motor otherwise compares favorably with the performance of known prior motors of the synchronous type.

For a better understanding of the above noted features of construction and operation of the synchronous motor of this application and its associated devices, and of other novel features and improvements which will appear hereinafter, reference may be had to the accompanying drawings wherein:—

Figure 1 is a diagrammatic illustration of the motor windings and external connections.

Figure 2 is a development of the secondary windings and conductors.

Figure 4 is a face view of one of the laminations of the rotor in which the distributed windings are carried.

Figure 3:
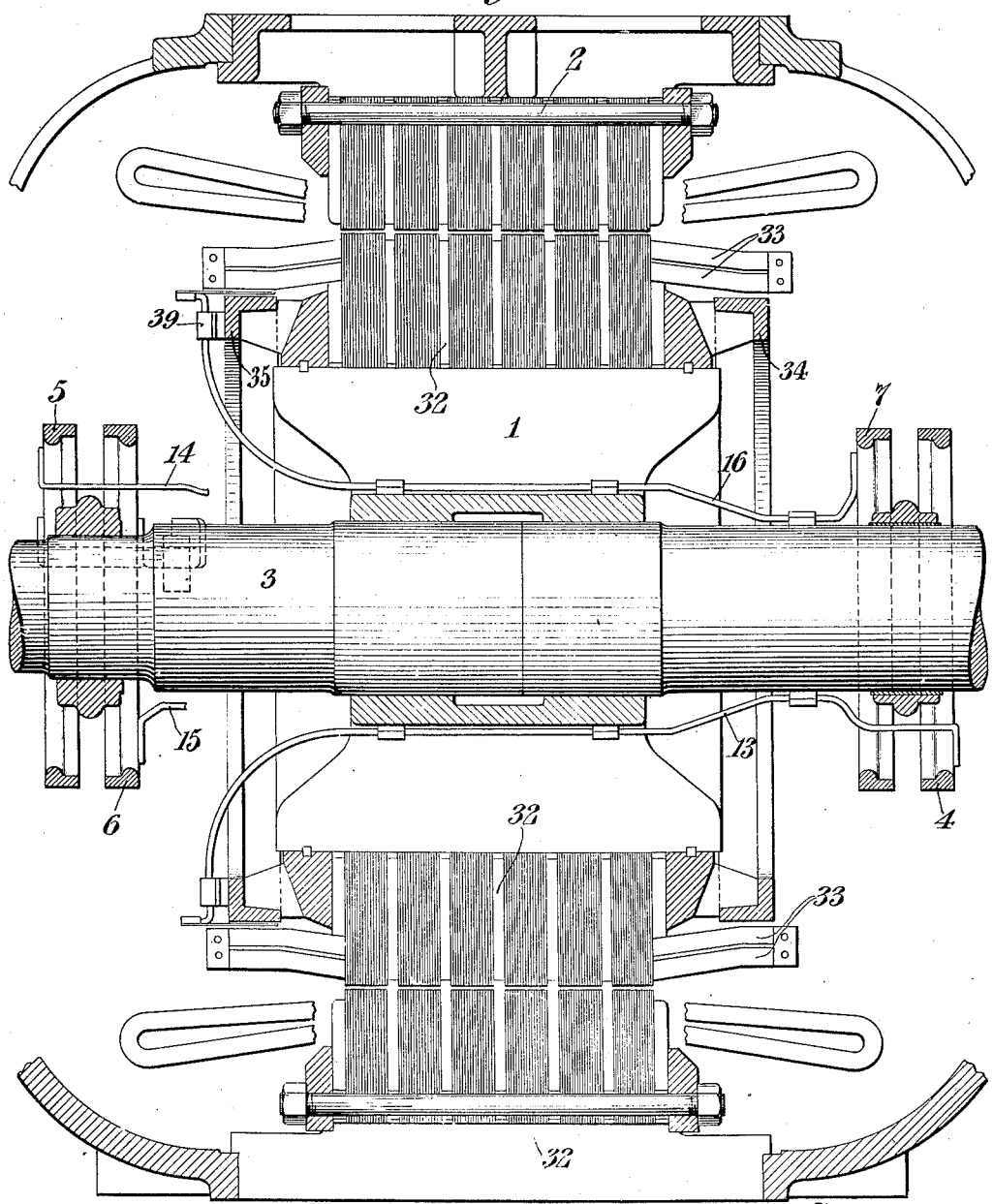
Figure 3 is a longitudinal sectional view through a motor embodying the improvements of this application.

Referring to the drawings where like numerals designates similar parts throughout a motor is illustrated embodying a rotor 1 and a stator 2, the rotor being mounted on a shaft 3 and the shaft 3 carrying two pairs of slip rings on opposite ends, these rings being conveniently designated 4, 5, 6 and 7.

The stator is conveniently illustrated as of the three phase type and as having a delta connection, but it may be star connected if desired, and it might well be of any desired multiphase or equivalent type.

The rotor 1 embodies an exciting and starting winding in sections 8, 9 and 10, these sections or branches being connected together at the neutral point 12 to form a three phase star connected winding for starting and leading respectively through connections 13, 14 and 15 to slip rings 4, 5 and 6, and a neutral connection 16 leading to a slip ring 7. Preferably the sections 8 and 9 are each of a greater number of turns than the winding 10 and as illustrated in the drawings the ratio of each of the windings 8 and 9 to the winding 10 is 5 to 2. The longer windings 8 and 9 are the main direct current exciting windings and form alternating north and south poles about the rotor or field member 1 for the purpose of operation as an alternating current dynamo or synchronous motor, these two windings 8 and 9 being distributed about the periphery of the field in slots suitably provided therefore as indicated in Fig. 2. The conductors of the exciting windings are illustrated in groups of ten conductors for each group and these groups are more or less concentrated or compacted together to form gaps or intermediate spaces for the alternating north and south poles. These gaps or intermediate spaces between the successive groups of conductors 8 and 9 are occupied by the conductors of the starting section 10, there being (in the present embodiment) two conductors for each of these intermediate spaces. In Fig. 4 a field or rotor lamination is illustrated as having the slots 8', 9' and 10' to accommodate the conductors of the windings 8, 9 and 10 respectively.

The slip rings 4, 5 and 6 lead respectively through adjustable resistances 17, 18 and 19, these resistances being controlled either separately or together, preferably in unison, by means of the switches 17', 18' and 19', these switches being tied together for simultaneous operation by means of the connection 20'. The resistances 17, 18 and 19 are adapted to be connected across slip rings 4, 5 and 6 through connections 21, 22 and 23 leading respectively to the double pole switch 24 and the single pole switch 25, the latter being connected through the conductor 26 with the left hand blade of the double pole switch 24. The upper contacts of the double pole switch 24 are connected together through a conductor 27. By closing switch 24 upon its upper contacts and upon closing switch 25 the resistances 17, 18 and 19 are connected across the slip rings 4, 5 and 6. The neutral conductor 16 leads through the slip ring 7 to the conductor 23, so that the resistance 19 is at all times connected across the starting winding 10.

The double pole switch 24 may be thrown downward to connect the exciting circuit 29 and 30 to the conductors 21 and 22 which lead through the resistances 17 and 18 and thence through the slip rings 4 and 5 to the sections 8 and 9 of the exciting winding of the field. The usual exciter 31 is indicated diagrammatically for supplying the exciting current to the fields 8 and 9.

The magnetic structure of the machine is indicated in Figs. 3 and 4, Fig. 4 illustrating an annular field lamination and Fig. 3 showing these laminations closely compacted together about the rotor spider with ventilating spaces 32 provided in planes at right angles to the shaft. The stator is provided with the usual armature structure, having ventilating spaces 32 corresponding to the ventilating spaces 32 of the field.

In Fig. 3 there are illustrated a pair of conductors 33 disposed in each of the field slots, one of these conductors being disposed above the other in the plane of the shaft axis. The field or rotor 1 carries the annular coil supports 34 and 35 which carry connections 39 for the conductors 13, 14, 15 and 16 leading to the slip rings, the ends of the conductors being thereby rigidly carried adjacent to and ready for attachment to the conductors 33.

By the particular arrangement and connections of the windings 8 and 9 which are concentrated in the slots 8' and 9' as indicated in Figs. 2 and 4 to form pole centers or faces in the intermediate spaces, a magnetic exciting field of the desired density is obtained when these windings are supplied with exciting current for synchronous motor operation, and by connecting up all three sections of winding as indicated diagrammatically in Fig. 1 the machine may be started and brought up to synchronous speed with the greatest facility, even under load conditions, without taking abnormally large currents from the alternating currents supply line 37 or without otherwise unduly distorting the line power factors.

The operation of the machine may be described as follows:

For starting the motor and bringing it to synchronous speed the switches 24 and 25 are thrown upwardly to connect the conductors 21, 22 and 23 together, thereby throwing the resistances 17, 18 and 19 across the slip rings 4, 5 and 6, and the primary member 2 is connected with the source of power 37 through the switch 38. The motor then proceeds to come to a speed dependent upon the resistances 17, 18 and 19, which resistances are short circuited gradually by the short circuiting switches 17', 18' and 19', the rotor being gradually brought up towards synchronous speed and the motor operating as a wound rotor induction motor of the three phase type, the three windings 8, 9 and 10 of the rotor being connected as above described across these resistances. The section or branch 10 being of fewer turns than windings 8 and 9 would induce currents of unequal value as compared to the currents in the windings 8 and 9 but the unequal resistances of the phases would tend to compensate for the unequal number of turns. It is preferable, however, to connect a smaller resistance in circuit with the smaller winding 10 than the resistances 17 and 18 in order to further compensate for the unequal induced currents and to utilize to the fullest extent the advantages of this motor and arrangement. For example, the resistance 19 is illustrated as of lesser value than the resistances 17 and 18.

With the machine running as an induction motor and at substantially synchronous speed except only as to the secondary slip, the switch 24 is then opened and thrown down putting the exciter 31 across the connections 21 and 22, thereby supplying the section 8 with exciting current, sections 9 and 10 being short circuited and the circuits being as follows:—Conductor 29 leading up through conductor 21, short circuiting switch 17', slip ring 4, conductor 13 and section 8, up through the neutral wire 16, through slip ring 7, through switch 25 to switch 24 and thence to the other side of the direct current line 30. The excitation of the winding 8 tends to pull the secondary or rotor into synchronism, the degree of excitation being controlled from the exciter 31 or through line resistances. When the field or rotor pulls into step for operation as a synchronous motor, the switch 25 is then opened, to break the short circuit around the section 9, thereby placing the two sections 8 and 9 in series across the exciter circuit, but leaving the short section 10 short circuited, the exciting circuit then being as follows: line 29, switch 24, conductor 21, switch 17', slip ring 4, field 8, field 9, conductor 14, slip ring 5, switch 18', conductor 22, switch 24 and line 30. The motor then continues to operate as an efficient synchronous motor, as above set forth, it being particularly designed with a view to operation as a synchronous power motor. The particular arrangement shown wherein the divided exciting winding (sections 8 and 9) is assisted in its function as a polyaxial closed circuit winding for effective induction motor effect at starting by the coil 10, has the further advantages that the latter winding (coil 10) functions with the coil 9 to maintain the torque during the synchronizing step and moreover occupies a position to serve as an effective damping coil during normal synchronous operation.

The interconnected exciting and starting windings 8, 9 and 10 are illustrated in this particular embodiment of the invention as embodied in the rotor element, but it is understood that the principles underlying the invention are equally applicable where the elements are reversed and the rotor is connected with the power line 37 and the stator embodies these interconnected windings; it is also understood that the drawings of this application are mainly for illustrative purposes as showing one specific embodiment of the improvements set forth.

Having thus fully described my invention what I claim as new and desire to secure by Letters Patent is:

1. The method of starting a synchronous alternating current motor having its direct current winding divided into at least two sections which consists in first connecting said sections so as to form a polyaxial closed circuited winding for starting from rest, then impressing a unidirectional E. M. F. on one of said sections and finally impressing a unidirectional E. M. F. on two of said sections.

2. The method of starting a synchronous alternating current motor having its direct current winding divided into at least two sections which consists in first connecting said sections to form a polyaxial closed circuited winding for starting from rest, then impressing a unidirectional E. M. F. on one of said sections and finally impressing a unidirectional E. M. F. on two of said sections in series.

3. The method of starting a synchronous alternating current motor whose exciting member is provided with a plurality of windings which consists in first connecting certain of said windings so as to form a polyaxial closed circuited winding for starting from rest, then impressing a unidirectional E. M. F. on one of said windings while certain others remain connected as a starting winding and finally impressing a unidirectional E. M. F. on two of said windings for normal synchronous operation.

4. The method of starting a synchronous alternating current motor having its exciting winding divided into sections which consists in first connecting said sections so as to form a polyaxial closed circuited winding for starting from rest, then impressing a unidirectional E. M. F. on one of said sections while a second section remains connected as a starting winding and finally impressing a unidirectional E. M. F. on the second named section in series with the first named section.

5. The method of starting a synchronous alternating current motor having three windings on its exciting member which consists in first connecting all of said windings as a polyaxial closed circuited winding for starting from rest, then disconnecting the short circuit of one of said windings and impressing a unidirectional E. M. F. thereon and finally disconnecting the short circuit of another of said windings and impressing a unidirectional E. M. F. thereon to assist the excitation of the first named winding.

6. The method of starting a synchronous alternating current motor having three windings on its exciting member which consists in first connecting all of said windings as a polyaxial closed circuited winding, then impressing a unidirectional E. M. F. on one of said windings while the other two remain connected as a polyaxial short circuited winding and finally impressing a unidirectional E. M. F. on two of said windings for normal synchronous operation while the third is connected as a short circuited damping winding.

7. The method of starting a synchronous alternating current motor having three distributed windings on its exciting member connected in star which consists in first connecting all of said windings upon themselves and each to the neutral point, then disconnecting one of said windings from the neutral point and impressing a unidirectional E. M. F. thereon while the other two windings remain connected upon themselves, and finally disconnecting one of the latter windings from the neutral point and impressing a unidirectional E. M. F. thereon while the third winding is maintained short circuited upon itself.

8. An alternating current synchronous motor having a distributed direct current winding divided into at least two sections adapted to be connected upon themselves to serve as an induction winding at starting and a third winding which is distributed with relation to the exciting winding and is adapted to be connected upon itself to assist the aforesaid sections as a torque producing induction winding at starting, and connections for either connecting one of said exciting sections with a D. C. exciting circuit, while the other section and the said third winding are connected upon themselves to serve as torque producing induction windings or connecting both sections of the D. C. winding across the D. C. exciting circuit.

9. An alternating current synchronous motor having a distributed direct current exciting winding divided into at least two sections adapted to be connected upon themselves to serve as an induction winding at starting and a third winding which is distributed with relation to the exciting winding and is adapted to be connected upon itself to assist the aforesaid sections as a torque producing induction winding at starting, and connections for either connecting one of said sections with a D. C. exciting circuit while the other section and the said third winding are connected upon themselves to serve as torque producing induction winding or connecting both sections of the D. C. winding in series across the D. C. exciting circuit.

10. An alternating current synchronous motor having its direct current winding divided into two sections, a direct current exciting circuit and a second winding of fewer turns than either of said sections, and connections for either connecting said windings as a polyaxial closed circuited winding for starting from rest, or connecting the exciting winding with the D. C. exciting circuit while the second winding is maintained short circuited upon itself.

11. An alternating current synchronous motor having its direct current winding divided into two sections and a third winding of fewer turns than the turns of either of said sections, which is connected up with said sections as a star connected induction winding and means for connecting said windings upon themselves to serve as torque producing induction windings at starting, and then connecting said sections with the D. C. exciting circuit while the winding of fewer turns is maintained short circuited upon itself.

12. An alternating current synchronous motor having an exciting member comprising a distributed D. C. exciting winding divided into two sections, means for connecting one of said sections or both of them with the D. C. exciting circuit, and a second distributed winding also carried by the exciting member, the said second distributed winding being embedded within the polar spaces of the poles produced by the combined excitation of both of said sections of the D. C. exciting winding, said second distributed winding being adapted to be connected up with the D. C. exciting winding as a torque producing induction winding at starting.

13. A synchronous motor having its D. C. exciting winding distributed and divided into two sections, an auxiliary winding disposed between the exciting windings, means for connecting said windings as an induction winding and connections for either exciting one of said sections with direct current to produce one flux distribution while the other section and the auxiliary winding are connected on themselves for transition from induction to synchronous operation or exciting both of said sections with direct current to produce another flux distribution while the auxiliary winding is short-circuited for normal synchronous operation.

14. An alternating current synchronous motor having its exciting field winding of distributed form and divided into sections of unequal distribution about the field member, and means for connecting all of said sections together to form a closed circuit winding for starting and for connecting the more closely concentrated sections with a source of direct current to form well defined alternating north and south poles with centers in the spaces occupied by the sections of the less concentrated winding.

15. In an alternating current synchronous motor, the combination of a primary member having a winding adapted to be connected with an alternating current source of power, with an exciting field member having a distributed exciting winding in three sections adapted to be connected together to obtain a three phase distributed winding effect for starting, certain of said sections being more closely concentrated together about the periphery of the exciting field member than others and adapted to be connected with a direct current source of power to form well defined alternating north and south poles with centers within the intermediate spaces occupied by the less concentrated sections of the winding, whereby the machine may be started and brought to synchronous speed as a wound secondary induction motor with a minimum current consumption and line disturbance and may be operated at a maximum efficiency and stability as a synchronous alternating current motor.

16. In an alternating current synchronous motor, the combination of a primary member having a winding adapted to be connected with an alternating current source of power, with an exciting field member having a distributed exciting winding divided into three sections, certain of said sections having a lesser number of turns than others, two of said sections being distributed about the field in groups of conductors to form well defined and distinct magnetic poles and spaces alternating with the groups of conductors and the third section being positioned within the pole faces and within the gaps formed between the aforesaid groups of conductors, all of said sections being adapted to be connected up as a rotary field winding for starting as an induction motor and certain of said sections being adapted to be connected with a direct current source for forming well defined alternating north and south poles for operation as a synchronous motor.

17. In an alternating current synchronous motor, the combination of a primary member having a winding adapted to be connected with an alternating current source of power, with an exciting field member having a distributed exciting winding in three sections, two of said sections being of equal length and uniformly distributed with reference to each other about the field member, the conductors thereof being concentrated in groups to form well defined magnetic pole faces between the concentrated groups thereof, and the third section being of an unequal number of turns with reference to the other sections and positioned within the magnetic pole faces or spaces between the groups of conductors thereof and means for connecting all of said sections together as a three branch closed circuited rotary field winding for starting as an induction motor and for connecting the sections of equal lengths in series across a source of direct current for forming well defined alternating north and south poles.

18. In an alternating current synchronous motor, the combination of a primary member having a winding adapted to be connected with an alternating current source of power, with an exciting field member having distributed field windings in three sections, one section having its conductors imbedded in the pole faces, means for connecting all three sections together to form a rotary field for starting as an induction motor and means for connecting either one of the other sections across a direct current source or both sections in series across this source.

19. In an alternating current synchronous motor, the combination of a primary member having a winding adapted to be connected with an alternating current source of power with an exciting field member having a distributed exciting winding comprising at least two sections of an unequal number of turns, the section of the greater number of turns being adapted to be connected across a direct current source of power for forming alternating north and south poles and the conductors of the section having the fewer turns being positioned within the pole faces, and connections including slip rings whereby said windings may be connected through resistances upon themselves, the winding of fewer turns having a resistance of lesser value connected therein and further connections whereby the winding of greater number of turns may be connected across a direct current source.

20. In an alternating current synchronous motor, the combination of a primary member having a winding adapted to be connected with an alternating current source of power, with an exciting field member having a distributed field winding comprising three sections with their conductors distributed in groups of unequal distribution about the periphery of the field member, said sections being connected in star to form a rotary field winding each of said three sections and the neutral point having connections leading through slip rings to external circuits, an external resistance connected in each of the circuits leading to the three windings, switch connections whereby the neutral connection and the three resistances are connected together, and further connections whereby a direct current source of power may be connected across the two field windings in series for operation as a synchronous motor.

21. In an alternating current synchronous motor, the combination of a primary member having a winding adapted to be connected with an alternating current source of power, with an exciting field member having three windings two of said windings being of an equal number of turns and being adapted to be connected across a direct current source of power through a pair of slip rings, the third winding having a smaller number of turns and leading through a third slip ring to an external circuit, said windings being connected in star and having a neutral circuit, an external resistance connected across the winding having the smaller number of turns through the medium of the third and fourth slip rings, external resistances of a larger value than the first named resistance in the circuits leading to the two exciting windings, connections for connecting said resistances across the slip rings for starting as a high torque induction motor, means for simultaneously and gradually short circuiting said resistances and further connections for connecting one of said exciting windings across the direct current source of power through the medium of its slip ring and the neutral connection and whereby the two exciting windings may be connected in series across the direct current source of power.

22. An alternating current synchronous motor having an exciting member comprising two distributed windings of an unequal number of turns together with means for first connecting said windings through resistances of unequal value upon themselves as a torque producing induction winding for starting and then connecting one of said windings across a D. C. exciting circuit while the other is short-circuited upon itself for synchronous operation.

23. An alternating current synchronous motor having an exciting member comprising a D. C. exciting winding divided into two sections and an auxiliary winding arranged and connected with said sections to produce a torque producing induction winding for starting said auxiliary winding having a different number of turns from said sections, together with means for connecting said sections and the auxiliary winding across resistances of unequal value for starting as an induction member, and for then connecting one of said sections across a D. C. exciting circuit while the other section and auxiliary winding are short-circuited and then connecting both of said sections across a D. C. exciting circuit while the auxiliary winding is short-circuited.

24. An alternating current synchronous motor having an exciting member comprising a D. C. exciting winding divided into two sections and an auxiliary winding arranged and connected in star with said sections to produce a torque producing induction winding for starting said auxiliary winding having a different number of turns from that of said sections, together with means for connecting said sections and the auxiliary winding across resistances of unequal value for starting as an induction member and for then connecting one of said sections across a D. C. exciting circuit while the other section and auxiliary winding are short circuited and then connecting both of said sections in series across a D. C. exciting circuit while the auxiliary winding is short circuited.

In testimony whereof, I have signed my name to this specification.

MILTON E. THOMPSON.